(12) United States Patent
Reed et al.

(10) Patent No.: US 7,722,005 B2
(45) Date of Patent: May 25, 2010

(54) PEDESTALS

(76) Inventors: Petra Reed, 229 Fulton St., Redwood City, CA (US) 94062; James P. Reed, 229 Fulton St., Redwood City, CA (US) 94062

( * ) Notice: Subject to any disclaimer, the term of this patent is extended or adjusted under 35 U.S.C. 154(b) by 0 days.

(21) Appl. No.: 12/218,590

(22) Filed: Jul. 15, 2008

(65) Prior Publication Data

US 2009/0050755 A1 Feb. 26, 2009

Related U.S. Application Data

(63) Continuation of application No. 10/734,868, filed on Dec. 12, 2003, now Pat. No. 7,407,144, which is a continuation of application No. 10/117,686, filed on Apr. 5, 2003, now Pat. No. 6,688,573, which is a continuation-in-part of application No. 09/905,702, filed on Aug. 2, 2001, now abandoned.

(60) Provisional application No. 60/310,138, filed on Aug. 2, 2001.

(51) Int. Cl.
*A47G 29/0014* (2006.01)
(52) U.S. Cl. .................. 248/346.01; 248/678; 108/181
(58) Field of Classification Search .......... 248/346.01, 248/346.02, 346.3, 678, 677, 188.1; 446/106, 446/105, 117, 122, 124; 126/25 R, 9 R
See application file for complete search history.

(56) References Cited

U.S. PATENT DOCUMENTS

| | | |
|---|---|---|
| 243,567 A | 6/1881 | Ireland |
| 1,214,928 A | 2/1917 | Lachman ............ 52/668 |
| 1,298,762 A | 4/1919 | Milligan |
| 2,119,821 A | 6/1938 | Manley |
| D118,463 S | 1/1940 | West |
| 3,176,676 A | 4/1965 | Caldwell ............ 126/25 |
| 3,297,168 A | 1/1967 | Summers ............ 14/73 |
| D221,781 S | 9/1971 | Calgan ............ D6/3 |
| 3,858,495 A | 1/1975 | Gotwalt ............ 99/421 HH |
| 4,408,741 A | 10/1983 | Mimura ............ 248/68.1 |
| 4,409,770 A | 10/1983 | Kawaguchi ............ 52/666 |
| D287,677 S | 1/1987 | Pomeroy et al. ............ D6/449 |
| 4,760,802 A | 8/1988 | Leong ............ 108/157 |
| 4,761,930 A | 8/1988 | Tepera ............ 52/669 |
| 4,955,490 A * | 9/1990 | Schafer ............ 211/187 |

(Continued)

OTHER PUBLICATIONS

ALOK Trade Brochure (Pedestal Designs), published before Aug. 2, 2000.

(Continued)

*Primary Examiner*—J. Allen Shriver, II
*Assistant Examiner*—Steven M Marsh
(74) *Attorney, Agent, or Firm*—T. H. P. Richardson

(57) ABSTRACT

A pedestal comprising a pedestal base whose upper surface defines at least two pairs of open channels. Each pair of open channels is sized and spaced so that a support member of constant cross-section can be slidably fitted into the pair of channels. The pairs of channels are positioned so that, when a straight support member is fitted into each pair of channels, all the support members are parallel to each other and form a platform for supporting objects. The pedestals are particularly useful in the catering and hospitality industry for supporting food and beverage containers, tableware, flower vases and sculptures.

14 Claims, 16 Drawing Sheets

U.S. PATENT DOCUMENTS

| | | | |
|---|---|---|---|
| 5,353,716 A | 10/1994 | Wilbert | 108/150 |
| 5,425,198 A | 6/1995 | Coy | 47/18 |
| 5,425,314 A * | 6/1995 | MacFarland | 108/51.3 |
| 5,463,786 A | 11/1995 | Mangone | 108/57.19 |
| 5,628,415 A | 5/1997 | Mulholland | 211/189 |
| 5,829,602 A | 11/1998 | St. John Danko | 211/13.1 |
| 5,887,513 A | 3/1999 | Fielding et al. | 99/421 A |
| 5,996,820 A | 12/1999 | Broadnax | 211/85.4 |
| 6,039,192 A * | 3/2000 | Hollander | 211/186 |
| D446,043 S | 8/2001 | Stoppenhagen et al. | D6/396 |
| 6,314,869 B1 | 11/2001 | Bourgeois, Jr. | 99/340 |
| D453,372 S | 2/2002 | Pecoskie | D23/332 |
| 6,505,804 B1 | 1/2003 | Francis et al. | |
| 6,915,994 B2 | 7/2005 | Oddsen | |
| 2003/0025060 A1 | 2/2003 | Reed et al. | 248/346.3 |
| 2006/0096508 A1 | 5/2006 | Herring | 108/54.1 |

OTHER PUBLICATIONS

U.S. Appl. No. 09/905,702, filed Aug. 2, 2001, Reed et al.

* cited by examiner

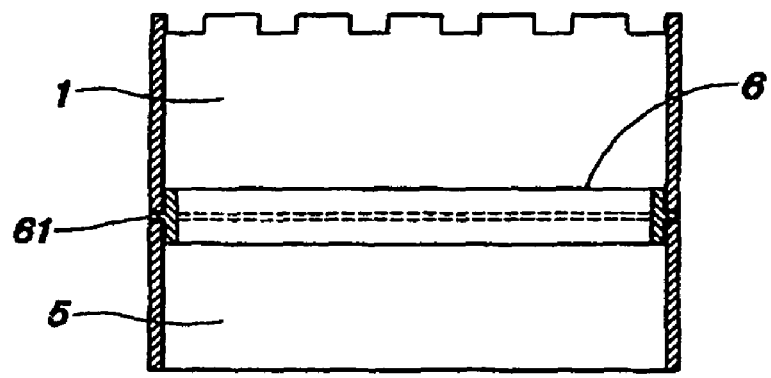
FIG. 6
FIG. 7
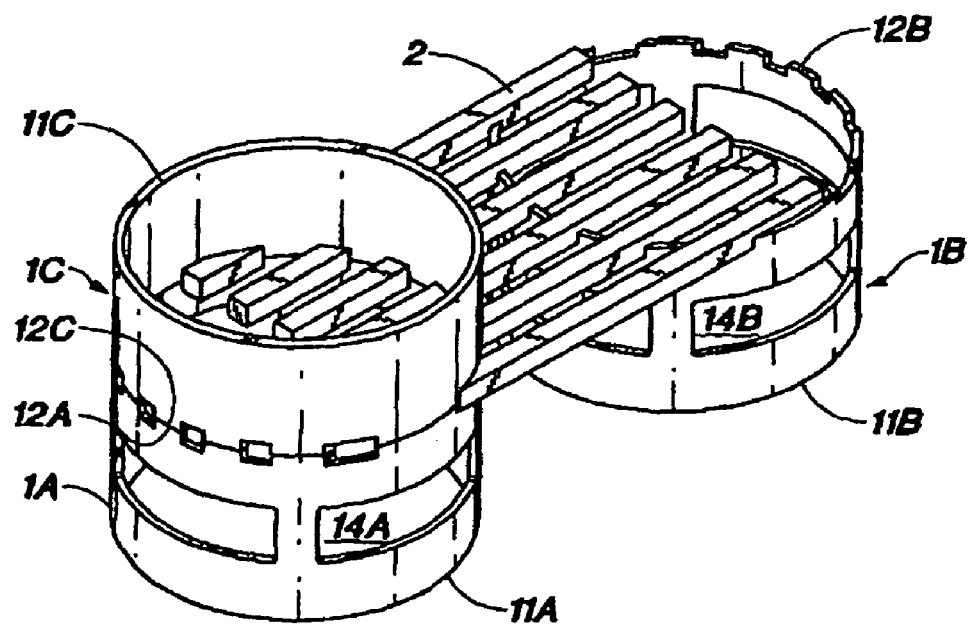
FIG. 8

PEDESTALS

CROSS-REFERENCE TO RELATED APPLICATIONS

This application is a continuation of our application Ser. No. 10/734,868, filed Dec. 12, 2003, now U.S. Pat. No. 7,407,144, which is a continuation of application Ser. No. 10/117,686, filed Apr. 5, 2003, now U.S. Pat. No. 6,688,573. Application Ser. No. 10/117,686 is a continuation-in-part of, and claims priority under 35 U.S.C. 120 from, U.S. application Ser. No. 09/905,702, now abandoned, filed Aug. 2, 2001, which resulted from the conversion under 37 CFR 1.59 (c) (3) of provisional application Ser. No. 60/310,138, filed Aug. 2, 2001, by Petra Reed, into a non-provisional application. The disclosure of each of the above-identified applications is incorporated herein by reference for all purposes.

BACKGROUND OF THE INVENTION

This invention relates to pedestals. The term "pedestal" is used herein to denote a structure which can be placed on the earth, on the floor of a building, or on an elevated surface (for example a buffet or other table, sideboard or desk) and which will support objects (e.g. tableware of all kinds) placed on top of the pedestal. For example, pedestals are widely used in the catering and hospitality industry to support serving dishes, containers, platters, trays, jugs, glasses, bottles, cutlery, ice sculptures and flower vases at positions chosen for functional and/or decorative reasons.

SUMMARY OF THE INVENTION

We have discovered, in accordance with the present invention, new and useful pedestals comprising a pedestal base and a plurality of (i.e. two or more) support members fitted into channels in the upper surface of the pedestal base. In most uses, the pedestal base has a lower surface resting on the floor or on a table or other elevated surface, and an upper surface which, with the support members, can support objects on top of the pedestal. Where reference is made herein to upper, lower, vertical, horizontal etc., those references assume that the pedestal base is being used in this way.

The pedestals of the invention can be easily assembled and disassembled, and the invention includes new and useful kits containing one or more pedestal bases and a plurality of support members which can be assembled with the pedestal base(s) to form the new and useful pedestals of the invention. The components of a kit can be packed into any suitable container, optionally having compartments for different components, for example a fabric bag. A kit comprising a plurality of separate pedestal bases and support members can be assembled into a wide variety of pedestals of different functionalities, shapes, dimensions and decorative appearances. The invention makes it possible for users to transport a kit of relatively small dimensions to, for example, a particular catering or display event, and to construct, on site, one or more pedestals adapted to the particular requirements of the event. After the event, the pedestal(s) can be easily disassembled, cleaned (for example in commercial washing facilities) and repacked as a compact kit for transport to storage or to another event.

Many of the pedestal bases used in the pedestals of the present invention are novel in their own right, and form part of the present invention.

We have also discovered new, original and ornamental designs for pedestal bases and for pedestals.

In a first aspect, this invention provides a pedestal which comprises (1) a pedestal base having an upper surface which defines at least two pairs of open channels, each pair of open channels being sized and spaced so that a horizontal straight support member of constant cross section can be slidably fitted into the pair of channels so that the position of each support member can be changed by sliding the support member horizontally within the channels, with a midsection of the support member lying between the open channels and having an open space underneath it, and the pairs of channels being placed on the upper surface so that, when a straight support member is fitted into each pair of channels, the support members are parallel to each other; and (2) at least two horizontal support members, each support member being slidably fitted into one of the pairs of channels in the upper surface of the pedestal base so that the position of the support member can be changed by sliding the support member horizontally within the channels with a midsection of the support member lying between the open channels and having an open space underneath it and with end sections of the support members extending beyond the channels and having an open space underneath each end section.

One or more of each pair of channels can optionally have associated therewith at least one additional channel which is sized and spaced so that a support member slidably fitted into the pair of channels can also be slidably fitted into the additional channel(s). The additional channel or channels can be in the same pedestal base or a different pedestal base.

The term "slidably fitted" is used herein to mean that, when the pedestal base is upright, with the open channels exposed, straight support members of constant cross section can be placed in respective pairs of the channels, and are supported by the channels so that the position of each support member can be changed by sliding the support member within the channels. The term "comprises" is used herein in its normal sense in patent law to mean that other components are optionally present.

In a second aspect, this invention provides a kit comprising one or more pedestal bases and a plurality of support members which can be fitted onto the pedestal base(s) to assemble one or more pedestals according to the invention.

In a third aspect, this invention provides a novel pedestal base which comprises a hollow tube having an upper peripheral surface and a lower peripheral surface, the upper peripheral surface including at least two pairs of open channels, each pair of open channels being sized and spaced around the peripheral surface so that a straight support member of constant cross-section can be slidably fitted into the pair of channels, and the pairs of channels being spaced around the upper peripheral surface so that, when a straight support member is fitted into each pair of channels, all the support members are parallel to each other. The tube can have any cross-section, for example a circular, oval, square or other regular cross section, or an irregular cross section, and can have a constant or varying cross-section. The tube can have a closed cross-section throughout its length or it can include additional channels which are not used to accommodate support members and which extend, axially or otherwise, from one or both peripheries. The tube can also include a slot which extends from one periphery to the other, so that no part of the tube has a closed cross-section. For example, the pedestal base can be part of a tube having a parallelogramatic (for example rectangular) cross-section. In one embodiment, the pedestal base consists essentially of only two of the adjacent walls of such a parallelogramatic tube. The two adjacent walls of such a tube can meet at a sharp or rounded apex. Such a base can also have open channels formed in the apex at which the adjacent walls meet, so that alternatively two such bases can be placed with their axes horizontal, and support members slidably placed in the open channels in the apices of the bases in accordance with the invention.

In a fourth aspect, this invention provides a novel pedestal base which comprises two or more separably interlocking wall members which together provide (i) a lower surface (including a plurality of spaced-apart lower surfaces) which can rest stably on a flat surface and (ii) an upper surface which includes at least two pairs of open channels, each pair of open channels being sized and spaced on the upper surface so that a straight support member of constant cross-section can be slidably fitted into the pair of channels, and the pairs of channels being positioned on the upper surface so that, when a straight support member is fitted into each pair of channels, all the support members are parallel to each other. The wall members can be parallelepipeds, preferably substantially rectangular parallelepipeds. One or more of the wall members can be of less height than the wall members having the open channels, thus serving to locate the wall members having the open channels in desired positions. The wall members are separable, i.e. can be disassembled from the interlocking configuration into individual components, e.g. for cleaning and storage. In some cases, the wall members can be interlocked in different configurations to provide pedestal bases of different sizes and shapes.

In a fifth aspect, this invention provides a novel pedestal base which comprises (i) a lower surface (including a plurality of spaced-apart lower surfaces) which can rest stably on a flat surface and (ii) an undulating (including sawtooth) upper surface which includes at least two pairs of open channels, each pair of open channels being sized and spaced on the undulating upper surface so that a straight support member of constant cross-section can be slidably fitted into the pair of channels, and the pairs of channels being positioned on the upper surface so that, when a straight support member is fitted into each pair of channels, all the support members are parallel to each other. The undulations in the upper surface can be such that tops of the undulations all lie in the same plane, so that the upper surface, viewed from the side, is flat, and is preferably horizontal. Alternatively or additionally, the undulations can be such that the upper surface, viewed from the side, is corrugated, with the channels in the upper surfaces of the corrugations.

BRIEF DESCRIPTION OF THE DRAWINGS

The invention is illustrated in the accompanying drawings. FIGS. 1-8 and 44-58 primarily illustrate the utility (functional) characteristics of the invention. In FIGS. 9-16, the support members are shown in broken lines in order to illustrate the ornamental design characteristics of particular embodiments of pedestal bases of the invention, in the absence of the support members.

FIGS. 1-3 are perspective, top and side views of a first pedestal of the invention;

FIG. 4 is a perspective view of a pedestal base of the third aspect of the invention having an apertured cap fitted thereon;

FIG. 5 is a perspective view of an apertured accessory for fitting on top of a pedestal base having support members extending partially across the top thereof;

FIGS. 6 and 7 are cross-sectional views of cylindrical pedestal bases of the third aspect of the invention comprising first and second tubular members and a tubular linking member placed between the first and second tubular members, so that they can be rotated relative to each other;

FIG. 8 is a perspective view of a pedestal of the invention including three pedestal bases;

FIGS. 9-13 are perspective, top, bottom, front and side views of a first pedestal base of the third aspect of the invention, the rear view being the same as the front view, with the support members depicted in broken lines so as to illustrate the design features of the pedestal base on its own;

FIGS. 14-16 are perspective, front and side views of a second pedestal base of the third aspect of the invention, the rear view being the same as the front view, and the front and side views being the same as the front and side views of the pedestal base shown in FIGS. 9-13; the pedestal base of FIGS. 14-16 is similar to, but not as tall as, the pedestal base shown in FIGS. 9-13; and, as in FIGS. 9-13, the support members are depicted in broken lines so as to illustrate the design features of the pedestal base on its own;

FIGS. 17-21 are perspective, top, bottom, front and side views of a first pedestal of the invention, the rear view being the same as the front view;

FIGS. 22-24 are perspective, front and side views of a second pedestal of the invention which is similar to, but not as tall as, the pedestal shown in FIGS. 17-21, the top and bottom views being the same as FIGS. 18 and 19.

FIGS. 25-29 are perspective, top, bottom, front and side views of a third pedestal base of the invention, the rear view being the same as the front view, with the support members depicted in broken lines so as to illustrate the design features of the pedestal base on its own;

FIGS. 30-34 are perspective, top, bottom, front and side views of a third pedestal of the invention, the rear view being the same as the front view;

FIGS. 35-38 are perspective, top, bottom and front views of a fourth pedestal of the invention, the side view being the same as the front view;

FIGS. 39-43 are perspective, top, bottom, front and side views of a fifth pedestal of the invention;

FIGS. 44-46 are top, side and end views of a sixth pedestal of the invention;

FIG. 47 is a top view of a seventh pedestal of the invention;

FIGS. 48-49 are side and end views of an eighth pedestal of the invention;

FIG. 50 is a plan view of a ninth pedestal of invention;

FIGS. 51 and 52 are side views of separably interlocking pedestal base members which can be assembled to provide the pedestal base for the pedestal shown in FIG. 50;

FIG. 53 is a plan view of a tenth pedestal of the invention;

FIGS. 54 and 55 are cross-sections taken on lines LIV-LIV and LV-LV of FIG. 3 without the support members;

FIG. 56 is a plan view of a pedestal base of the third aspect of the invention;

FIG. 57 is an end view of a pedestal of the invention comprising two pedestal bases as shown in FIG. 56 and support members fitted into the open channels in the apices of the pedestal bases; and FIG. 58 is an end view of a pedestal of the invention comprising a pedestal base as shown in FIG. 56 and support members fitted into the channels in the ends of the pedestal bases.

DETAILED DESCRIPTION OF THE INVENTION

Figure 1:
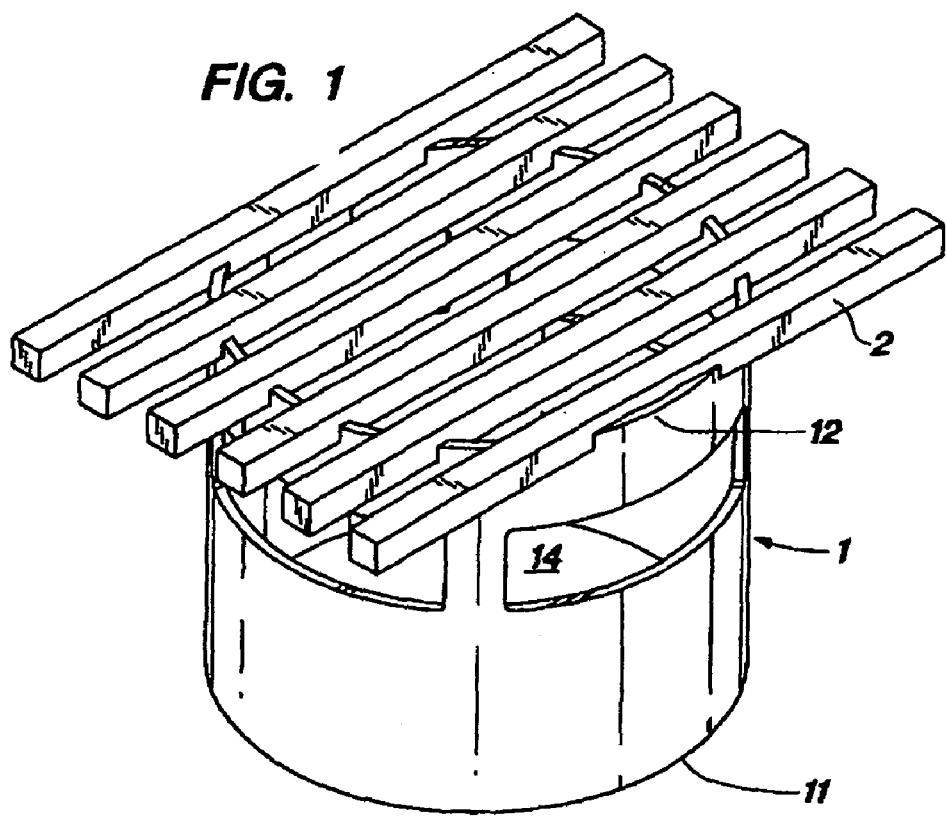

In the Summary of the Invention above, in the Detailed Description of the Invention, and the Claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular drawing or a particular claim, that feature can also be used, to the extent possible, in combination with and/or in the context of other particular aspects, embodiments, drawings or claims of the invention, and in the invention generally.

Pedestal Bases

The pedestal base used in the first aspect of the invention can be of any form which can provide the defined pairs of open channels. For example, the pedestal base can comprise (a) a tube of closed cross-section;
(b) a tube of open cross-section,
(c) two or more wall members, each preferably having the same height, for example a first wall member comprising a plurality of first open channels and a second wall member comprising a plurality of second open channels, each of the first open channels forming, with one of the second open channels, one of the defined pairs of channels; such wall members can be separate or interlocked or otherwise secured together. Such wall members, if secured together, are preferably secured in such a way that they can be easily disassembled for cleaning and storage; or
(d) a pedestal base according to the fourth or fifth aspect of the invention.

The pedestal base preferably provides least three pairs, particularly at least four pairs, for example 5, 6 or 7 pairs, but generally not more than 12 pairs, for example not more than 8 pairs, of open channels. In some embodiments of the invention, the upper surface of the pedestal base provides channels, but the lower surface does not. In other embodiments, both the upper surface and the lower surface include channels. Each pair of open channels is sized and positioned on the upper surface so that a straight support member of constant cross-section can be slidably fitted into the pair of channels. Preferably, all the open channels have cross-sections such that support members of the same cross-section can be slidably fitted into each of them. The pairs of channels are positioned so that when a straight support member is slidably fitted into each pair of channels, all the support members are parallel to each other, and preferably so that the support members are equally spaced from each other.

The two channels making up a pair of channels are often mirror images of each other, and the dimensions of the pairs of channels depend in part on the angular relationship between the surface and the support member. For example, if a support member crossing a cylindrical pedestal base forms a chord at, or close to, a diameter of the base, the channels into which the support member is fitted preferably have an open cross-section whose width (i.e. horizontal dimension measured around the cylinder) is slightly larger than the width of the support member (measured at right angles to its axis). But if the support member forms a chord at or close to a tangent to the interior surface of the pedestal base, the channels have an open cross-section whose width (i.e. horizontal dimension measured around the cylinder) is much larger than the width of the support member (measured at right angles to its axis).

Often, the upper surface of the pedestal base, except where it is interrupted by the channels, lies in a single, preferably horizontal, plane. Similarly, the lower surface of the pedestal base preferably also lies in a single, preferably horizontal, plane. However, it is also possible for one or both of the surfaces to be irregular, for example to have a repeating waveform. Any irregularity in the upper surface preferably does not cause the upper surface to extend above the upper surface of the support members. Any irregularity in the lower surface preferably does not prevent the lower surface from resting stably on a flat, preferably horizontal, surface. It is possible for one or both of the upper and lower surfaces to lie in a plane which is not horizontal, for example when the pedestal base is to be placed upon a surface of known and regular slope, or when it is desirable for the upper surfaces of the support members to lie in a plane inclined to the horizontal.

In some embodiments, the pedestal base is a hollow tube having a closed cross-section throughout its height, except for the irregularities caused by the channels. In other embodiments, the wall of the tube has apertures therein. In one embodiment, the apertures are sized and placed so that the pedestal base can be easily handled by a user and/or so that useful accessories can be hooked onto the interior or exterior of the tube. In this embodiment, preferably there are three to six apertures, particularly four apertures, which are of the same size and are uniformly spaced around the tube. The apertures can for example be substantially identical rectangles with rounded corners, each rectangle having a height which is 0.1 to 0.9 times, e.g. 0.1 to 0.5 times, preferably 0.15 to 0.4 times, the height of the tube, and whose combined width (measured around the walls of the tube) is 0.3 to 0.95 times, e.g. 0.6 to 0.95 times, preferably 0.7 to 0.9 times, the circumference of the tube.

In another embodiment, at least 2 pairs of apertures, preferably at least 3 pairs of apertures, for example 5, 6 or 7 pairs of apertures, are sized and placed in the wall of the pedestal base so that additional support members (whose cross-section may be the same as or different from the cross-section of the support members placed in the channels in the upper surface) can be inserted through each pair of apertures to form a platform within the pedestal base. Such a platform can be used, for example, to support a solid fuel heater or an ice tray or bucket, in order to heat or cool a serving dish placed on the support members or on a cap placed on top of the pedestal base in place of the support members; optionally, such a cap is apertured.

Alternatively or additionally, the apertures can serve a decorative purpose.

The pedestal base can also include additional channels which are not used to accommodate support members, and which extend, axially or otherwise, from one or both peripheries. The pedestal base can also include a slot which extends from the top surface to the bottom surface, so that the pedestal base has an open cross-section throughout its height.

When the pedestal base is tubular, it can have any cross-section, for example a circle (which is preferred), oval, square or other regular cross-section, or an irregular cross-section. The cross-section of the tube is preferably constant. However, the cross-section, and/or the dimensions of the cross-section, of the tube can change, regularly or irregularly, along the axis of the tube.

It is possible for the pedestal base to have open channels in its lower surface as well as its upper surface, in which case the open channels can be such that support members placed in the upper surface are parallel to, or at an angle to, for example a right angle to, support members placed in the lower surface.

In some embodiments the pedestal base comprises a single monolithic article or a single article composed of a plurality of components in contact with each other. In the latter case, the components can be side-by-side and/or one on top of the other, and can be secured together, for example, by gravitational forces and/or by interlocking members and/or by clips, catches, hinges, bolts, screws, or other mechanical or magnetic means. In one embodiment, the pedestal base comprises two or more cylindrical members having substantially the same diameter and the same or different heights selected to make a pedestal base of desired height. In another embodiment, the pedestal base comprises two or more wall members, each wall member having the same height as the finished pedestal base and the wall members being secured, e.g. interlocked, together.

In one embodiment, the pedestal base comprises two or more members, preferably tubular members, which lie on top of each other and which can be rotated relative to each other about the axis of the pedestal base. This makes it possible to align the support members in a desired direction. This is desirable for ease of assembly when assembling a pedestal that includes two or more pedestal bases, and for rotating a pedestal having a single pedestal base so that a serving dish, flower vase, ice sculpture or other object placed thereon can be oriented in a desired direction. This also makes it possible to assemble a pedestal base from which sets of support members can extend at different levels in directions at angles, for example at right angles, to each other. In one example of this embodiment, one of the tubular members has an exterior lip and the other has an interior lip, and the lips fit rotatably to each other. In another example of this embodiment, the pedestal base comprises a lower tubular member, an upper tubular member, and a tubular linking member between the lower and upper tubular members. For example, the tubular linking member preferably comprises (i) a radial section which extends between the upper and lower members, and (ii) a tubular section having an upper portion which is adjacent to but spaced apart from the upper tubular member and a lower portion which is adjacent to but spaced apart from the lower tubular member.

The tubular section maintains the upper and lower members in place. It can surround at least part of the exterior wall of the periphery of one of the upper or lower members and/or at least part of the interior wall of the periphery of the other one of the upper and lower members. The radial section can comprise friction-reducing means, for example one or more ball bearings, for example a ball race, so that the upper and lower members are more easily rotatable relative to each other.

The pedestal base can be of any suitable dimensions. When the base is a cylindrical tube, as is preferred, its exterior diameter can for example be 4 to 24, preferably 8 to 16, in.; its height can for example be 3 to 60 in., e.g. 3 to 24 in, preferably 4 to 12 inches, for example about 6 in. or about 9 in.; and the ratio of its exterior diameter to its height can for example be 0.6 to 4.0, preferably 1.0 to 2.8. When the base is not cylindrical, Its exterior circumference can for example be from 12 to 75, preferably 25 to 50, in.; its height can for example be 3 to 60, preferably 4 to 12, in.; and the ratio of its exterior circumference to its height can be for example 2.0 to 12.6, preferably 3.1 to 9.0. The wall thickness of the tube can be for example 0.1 to 1, preferably 0.2 to 0.5, in.

Support Members

The pedestals of the first aspect of the invention include at least two support members. The dimensions of the support members and of the channels in the pedestal base into which they fit should be correlated so that straight support members can be slidably fitted into the channels.

The cross-section of the support members and the height of the open channels in the pedestal base are preferably correlated so that the top surfaces of the support members lie in a single plane, generally but not necessarily a horizontal plane.

In some embodiments of the invention, no part of the pedestal base extends above the top surface of the support members. In this embodiment, preferably a horizontal plane containing the top surfaces of the support members is substantially higher than a horizontal plane containing the upper surface of the pedestal base; for example, the distance between the planes can be 0.3 to 0.7 times the height of the support members. For example, the distance can be such that a second pedestal base, preferably a pedestal base having a channel-containing upper surface identical to the channel-containing upper surface of the first pedestal base) can be placed "upside-down" on top of the support members and can be slid along the support members, for example so that the axes of the two pedestals coincide.

In other embodiments of the invention, the periphery of the pedestal base, except where it is interrupted by the open channels, extends above the top surfaces of the support members, thus forming a rim which helps to prevent dishes or other objects placed on the support members from being pushed off the pedestal.

The support members can have any cross-section which enables them to be fitted, preferably slidably fitted, into the open channels. Preferably all the support members have the same cross-section. Preferably the support members have a cross-section having three or more equal sides so that it is not necessary to rotate the member in order to achieve the right orientation for the open channel. It is also preferred, in order to enhance the lateral stability of the support members, once they have been placed in the open channels, that each side of the support member has a vertical section adjacent to a vertical section of the channel, for example a square, hexagonal or octagonal cross-section. A square cross-section is particularly preferred.

Preferably all the support members are straight. However, although, as noted above, the open channels in the pedestal base must be such that they will accept a plurality of straight members, it is not necessary that each, or even any, of the support members is straight throughout its length. It is preferred, however, that each support member comprises straight sections which can be slidably fitted into the open channels. The support members can also include location devices intended to make it easier to achieve desired configurations.

The support members can have any suitable dimensions. When the support member has a square cross-section, each side of the square can for example be 0.25 to 3, or 0.25 to 2, preferably 0.5 to 1.5, in. long. When the support member has a different cross-section, the peripheral length of the cross-section can for example be 0.75 to 12, preferably 2 to 6, in. The length of each support member must be sufficient that it is supported in at least two channels of a pedestal base. Thus, for a pedestal having a single tubular pedestal base, the length of each support member is generally at least 1.1 times, preferably at least 1.2 times, for example 1.2 to 2.0 times, the largest horizontal dimension of the pedestal base.

The distance between the adjacent support members should be small enough to ensure that objects likely to be placed on the pedestal will be stably supported by the support members. Thus, this distance is generally not more than 2.5 in., preferably not more than 2.0 in., for example 0.25 to 2.5 in., preferably 1.0 to 2.0 in.

The support members can be a solid and/or hollow. They can also be telescopic.

Pedestals including Two or More Pedestal Bases

The pedestals of the present invention can include two or more pedestal bases. In such pedestals, each support member is preferably slidably fitted into a pair of open channels in each base pedestal. However it is also possible for one or more (including all) of the support members to be slidably fitted into a pair of open channels in one pedestal base and a single open channel in another pedestal base. As noted above, when the support members are fitted into a single open channel in each of two or more separate articles, the separate articles together constitute a single pedestal base.

In one embodiment, a pedestal comprises
(1) a first base pedestal which includes open channels in its upper periphery,
(2) a second base pedestal which includes open channels in its upper periphery and is spaced apart from the first base pedestal, and which is preferably identical to the first base pedestal, and
(3) a plurality of support members, at least some of which are slidably fitted into a pair of open channels in the first base pedestal and into a pair of open channels in the second base pedestal.

Such a pedestal can further comprise a third base pedestal whose lower periphery includes open channels which are slidably fitted onto the plurality of support members (3). In another embodiment, a pedestal comprises
(1) a first base pedestal having open channels in its upper surface,
(2) a second base pedestal having open channels in its lower surface and whose axis is substantially the same as the axis of the first base pedestal, and
(3) a plurality of support members, each of which is slidably fitted into a pair of open channels in the first base pedestal and into a pair of open channels in the second base pedestal.

Pedestal Bases Including Accessories

The pedestal bases of the invention can also be used to support accessories in addition to, or in place of, the support members. For example, apertures in the wall of a pedestal, or ledges or hooks on the interior or exterior wall of a pedestal, can be used to support ice trays or sources of heat in order to cool or to heat food placed on the support members. Other useful accessories can be supported by the upper surface of the pedestal base. Such accessories can be used in place of or in addition to the support members. One such accessory is a cap that fits over the upper periphery of the pedestal base, for example so as to conceal any channels therein, to provide a solid or apertured cover over part or all of the base. A second such accessory has arms that fit into channels in the upper periphery of the base, to provide a solid or apertured support surface over part or all of the base, the support surface being above, level with, or below the periphery. A third such accessory is used in conjunction with support members that extend only part of the way across the base, and has arms that fit between the support members and rest on top of the periphery of the base, preferably providing, with the support members, a substantially continuous support surface. When the accessory is apertured, this converts the pedestal base into a pedestal within which can be placed a source of heat, for example a solid fuel heater, and which then serves as a grill or as a hot plate for keeping food hot.

The pedestals of the invention can also include accessories which have
(a) lower portions designed to engage, optionally slidably, the upper surface of at least one support member, so that the accessory is supported on top of the support member, or
(b) upper portions designed to engage, optionally slidably, at least one support member which extends between two pedestal bases, so that the accessory hangs below the support member.

Such an accessory can serve to support two or more additional support members which extend at an angle, for example a right angle, to the support members engaged by the accessory.

Materials for the Pedestal Bases and Support Members.

The pedestal bases and support members can be made of any material having properties suitable for the way in which the pedestal is to be used. For general-purpose use, metal is a preferred material. However, it is also possible to use natural or synthetic polymeric materials, or wood, to obtain particular functional or aesthetic results and/or to strike an economic compromise between cost and performance. High melting synthetic polymers, for example polyphenylene sulfides and polyether ether ketones, can be used when a heat resistant pedestal is needed. Other materials that can be used, when their properties are suitable for the way in which the pedestal is to be used, include rigid polyvinyl chloride, polymethyl methacrylate, acrylate resins, liquid crystal polyesters, polycarbonates and cellulosic materials, for example corrugated paper products. Preferably, the material has a matte finish, so that it does not show fingerprints, is resistant to staining by food and beverages, and is resistant to detergents and other materials used in commercial washing systems. We prefer to use aluminum which has been finished so that it has a gray, metallic appearance.

Preferably, the pedestal bases and support members are free of crevices which might trap food or bacteria; for this reason, the presence of screws in the pedestals and support members is preferably avoided.

Referring now to the drawings, like components are referred to by the same reference numerals in FIGS. 1-8 and 44-49. The other Figures do not contain reference numerals because they illustrate ornamental design characteristics In FIGS. 1-3, a pedestal comprises a cylindrical pedestal base 1 having a lower periphery 11, an upper periphery 12 and apertures 14, which are the same size and uniformly spaced around the base. The upper periphery 12 includes six pairs of open channels 121, and a support member 2 of square cross-section is slidably fitted into each pair of channels.

Figure 2:
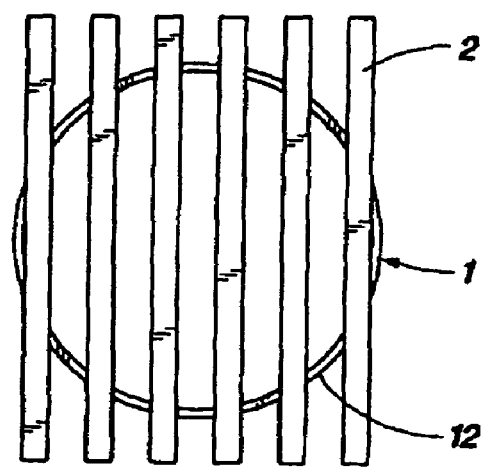
Figure 3:
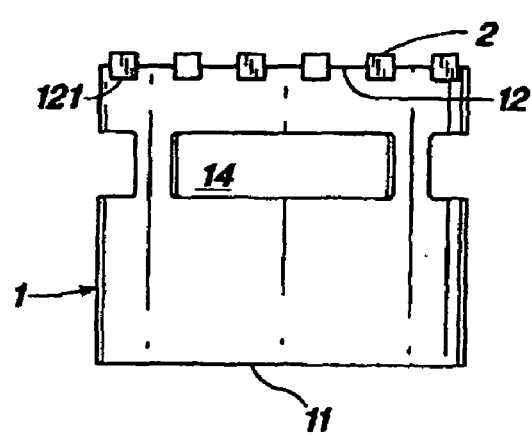
Figure 4:
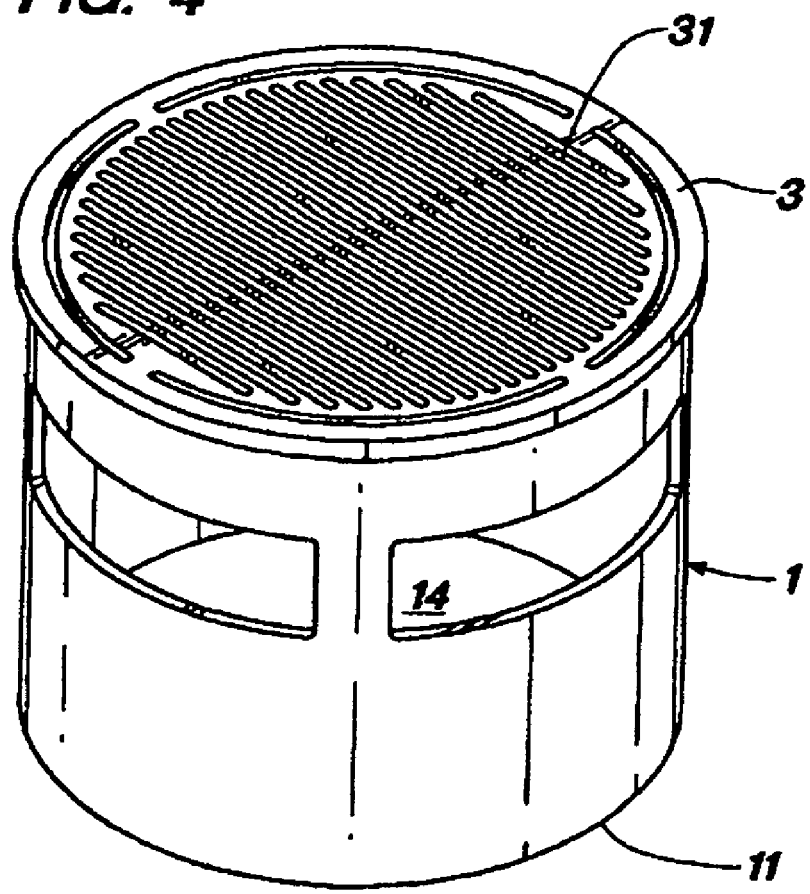

In FIG. 4, a cap 3 containing a plurality of apertures 31 is fitted over the top of a pedestal base 1 as shown in FIGS. 1-3, instead of the support members.

Figure 5:
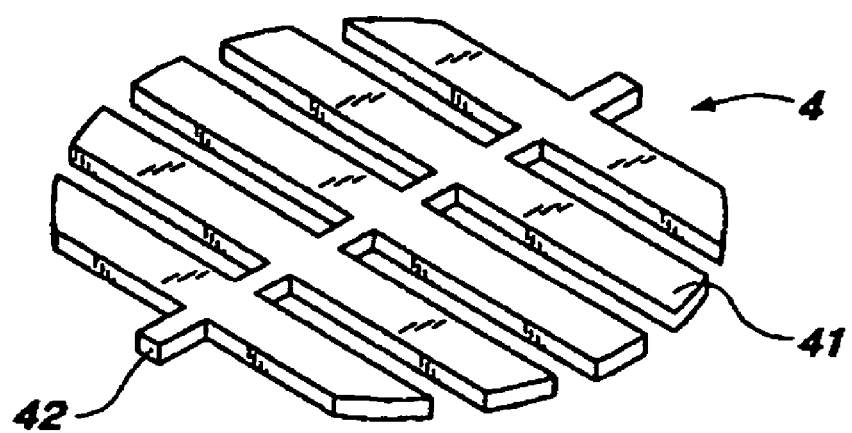
Figure 9:
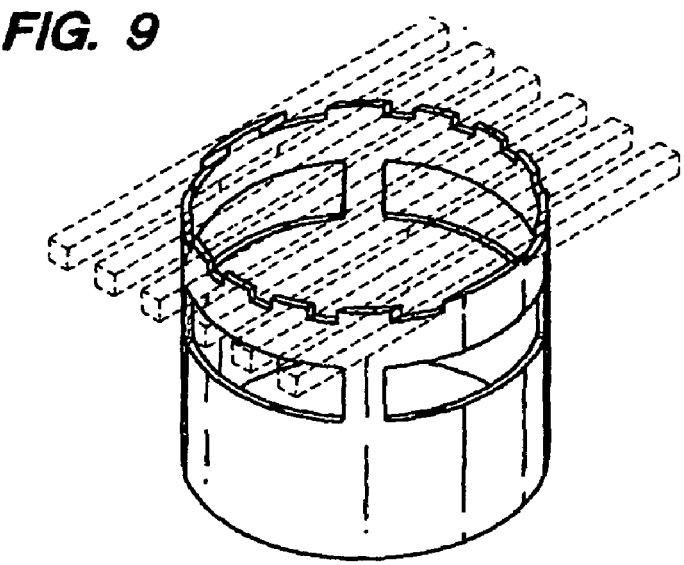
FIGS. 9-43 primarily illustrate the ornamental design characteristics of particular embodiments of the invention.
Figure 10:
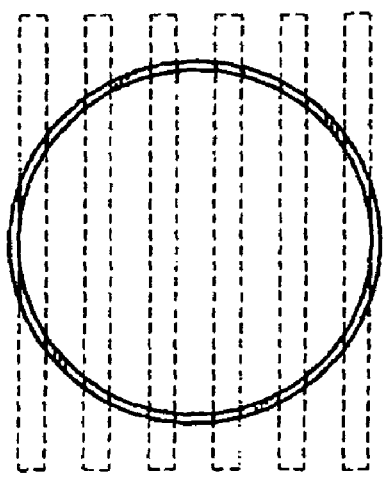
Figure 11:
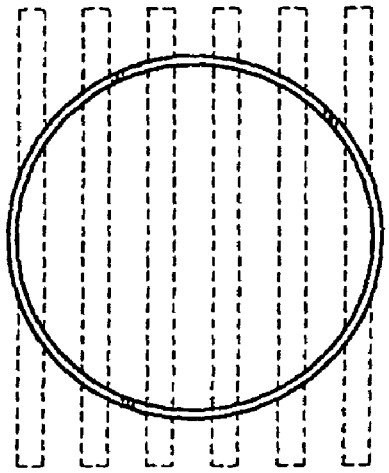
Figure 12:
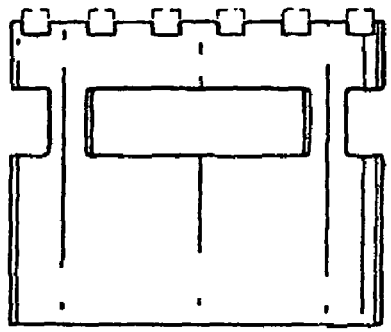
Figure 13:
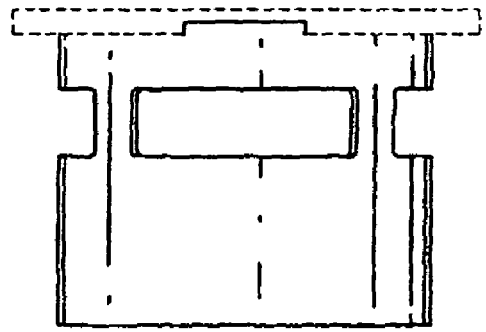
Figure 14:
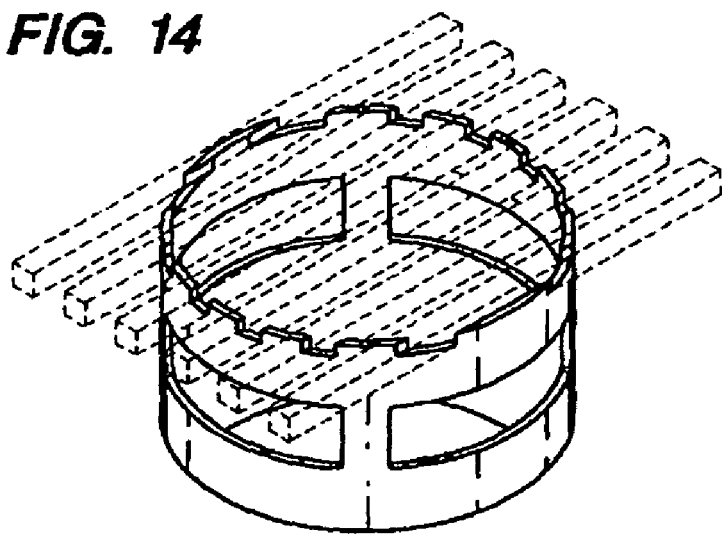
Figure 15:
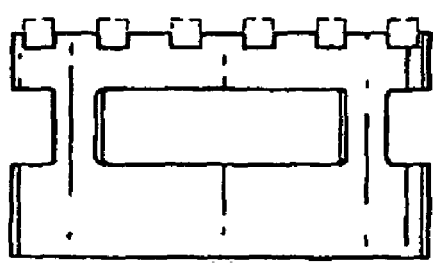
Figure 16:
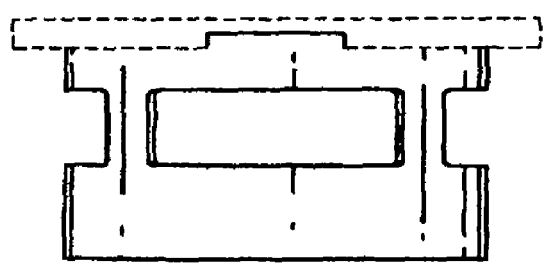
Figure 17:
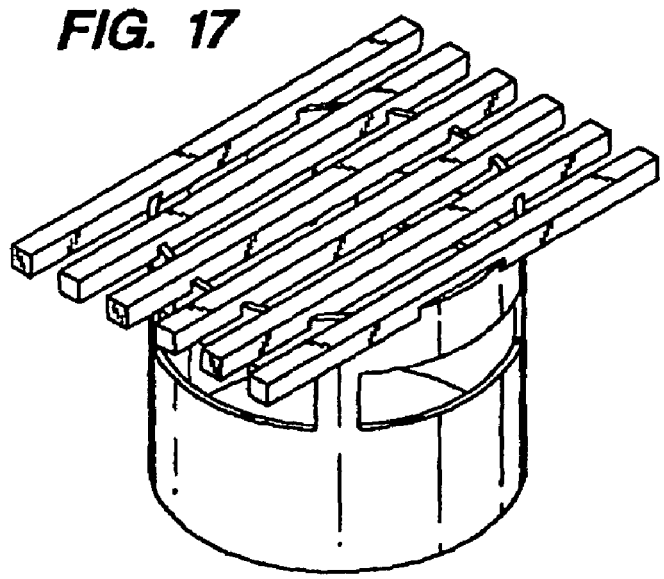
Figure 18:
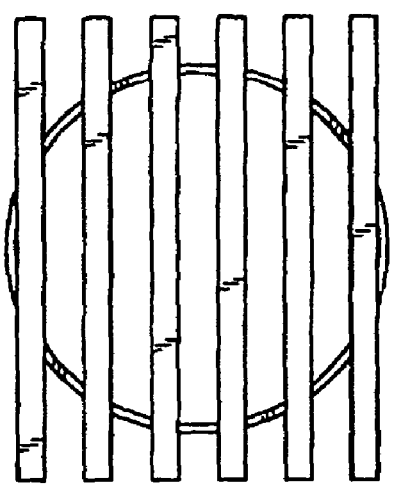
Figure 19:
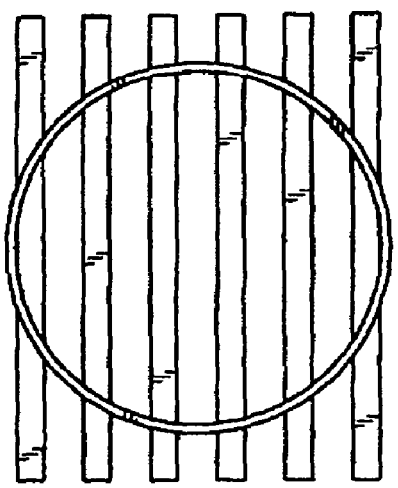
Figure 20:
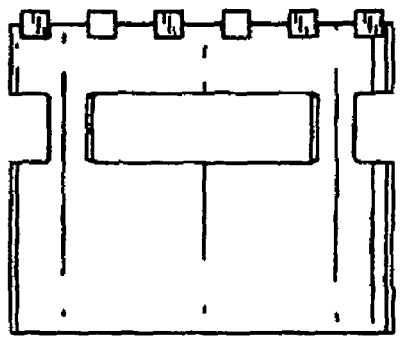
Figure 21:
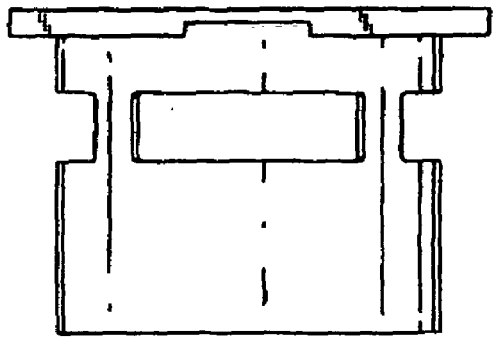
Figure 22:
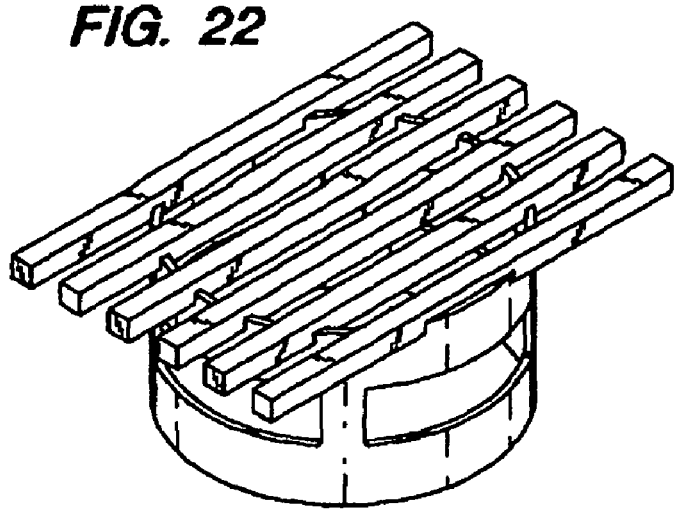
Figure 23:
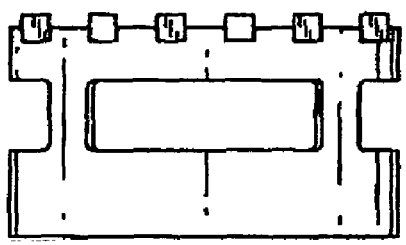
Figure 24:
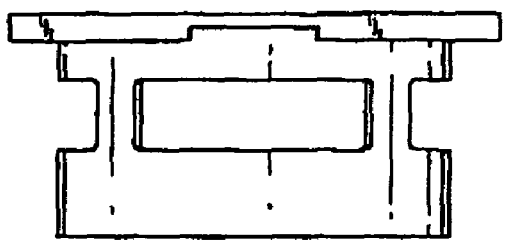
Figure 25:
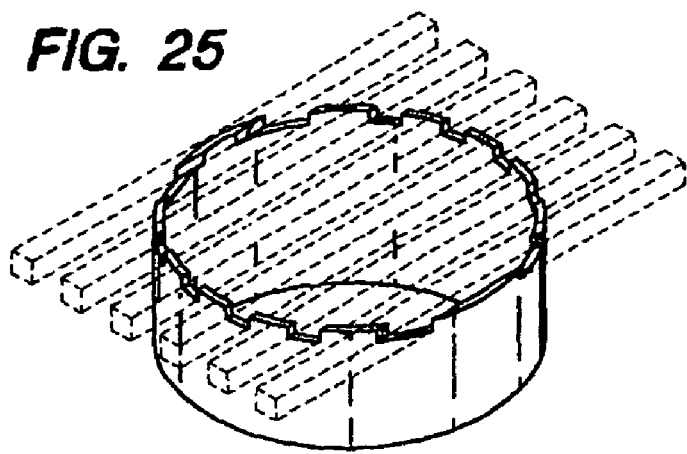
Figure 26:
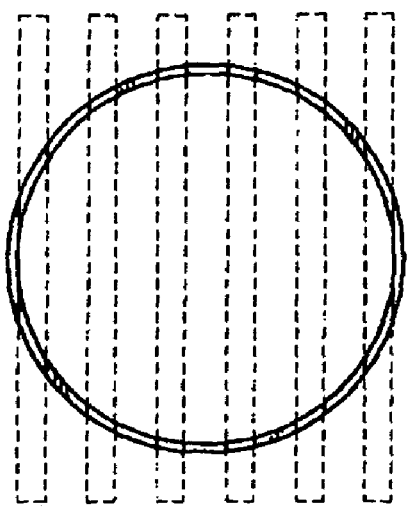
Figure 27:
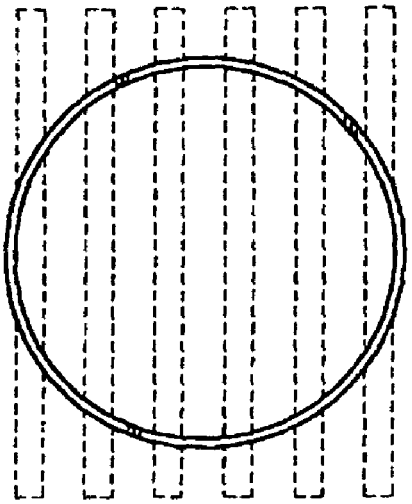
Figure 28:
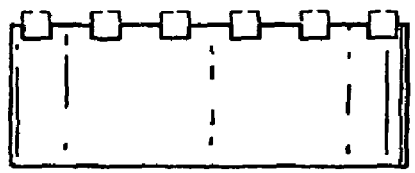
Figure 29:
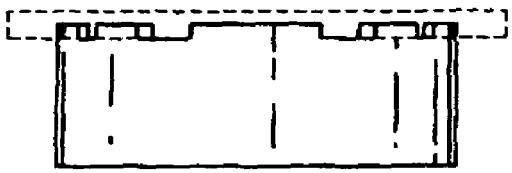
Figure 30:
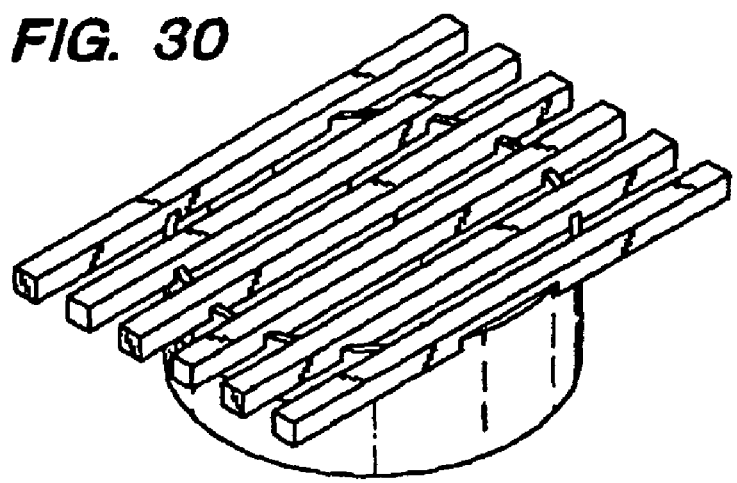
Figure 31:
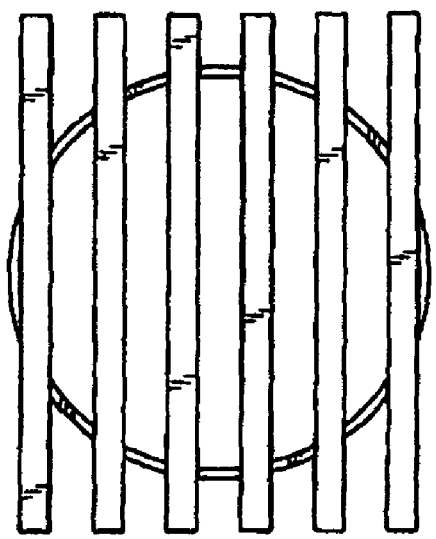
Figure 32:
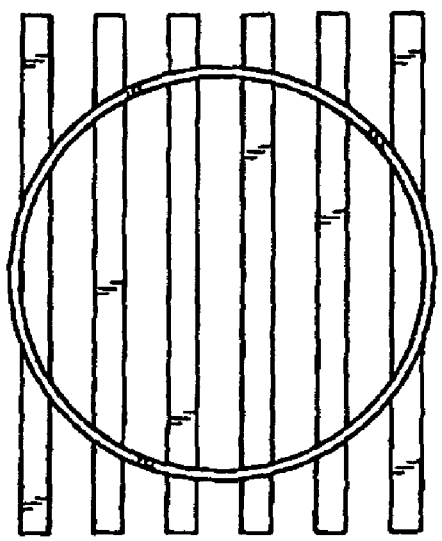
Figure 33:
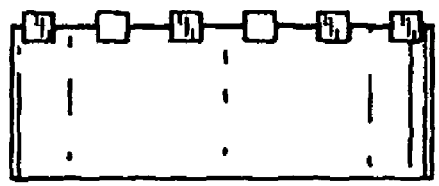
Figure 34:
Figure 35:
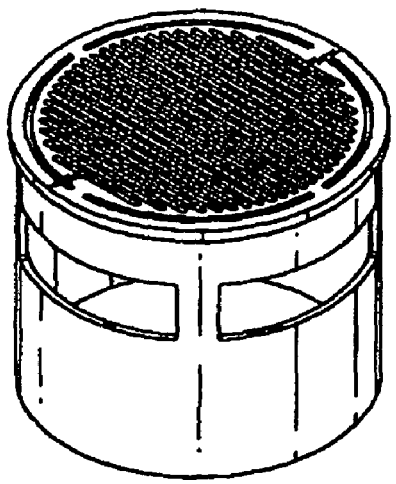
Figure 36:
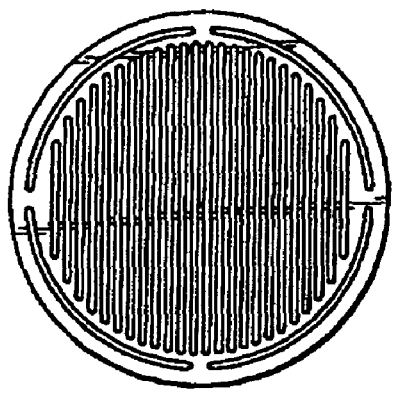
Figure 37:
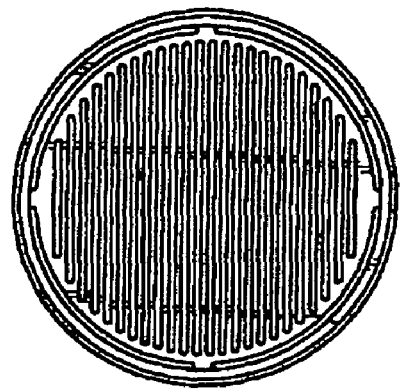
Figure 38:
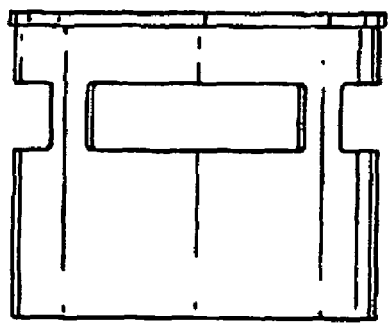
Figure 39:
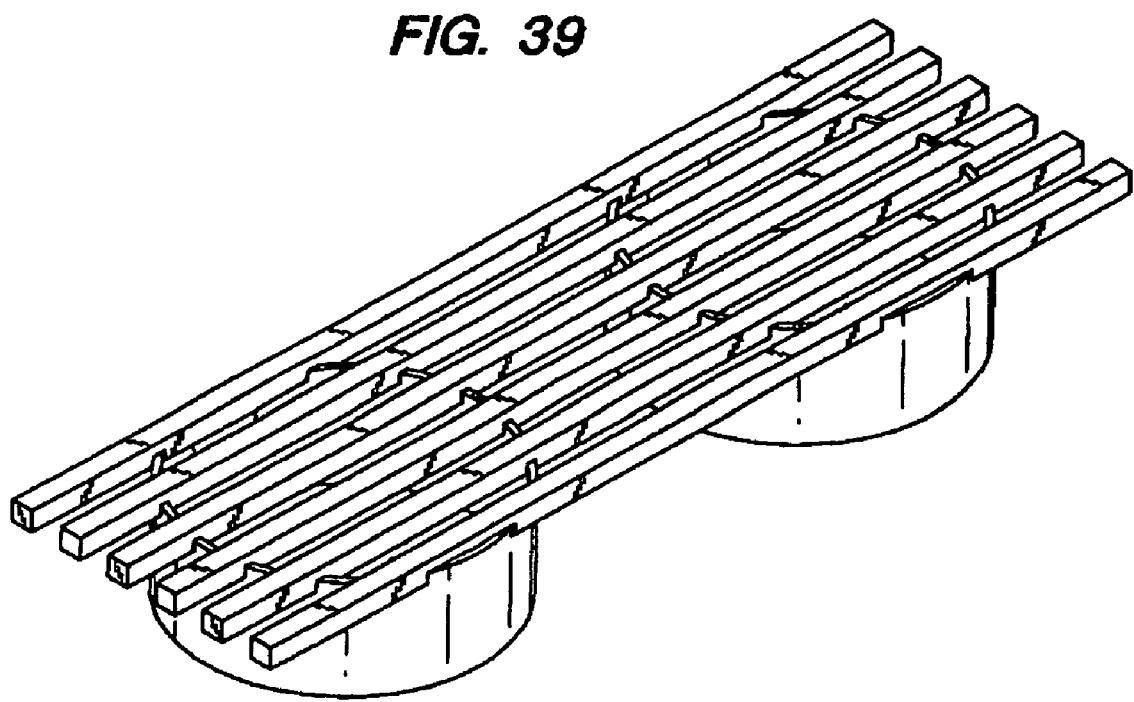
Figure 40:
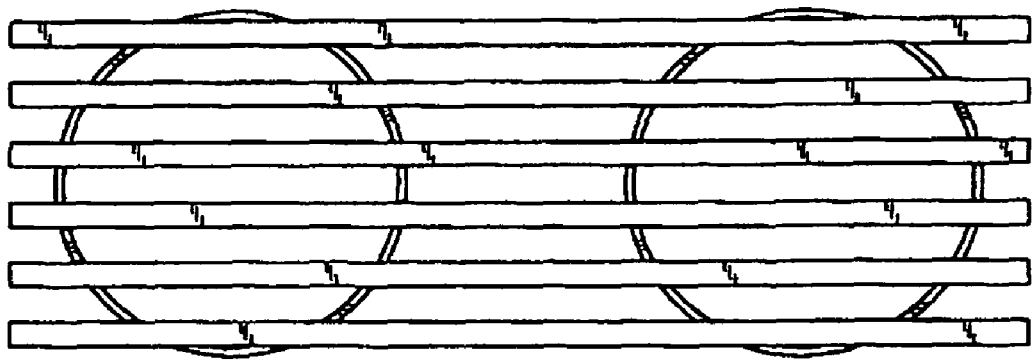
Figure 41:
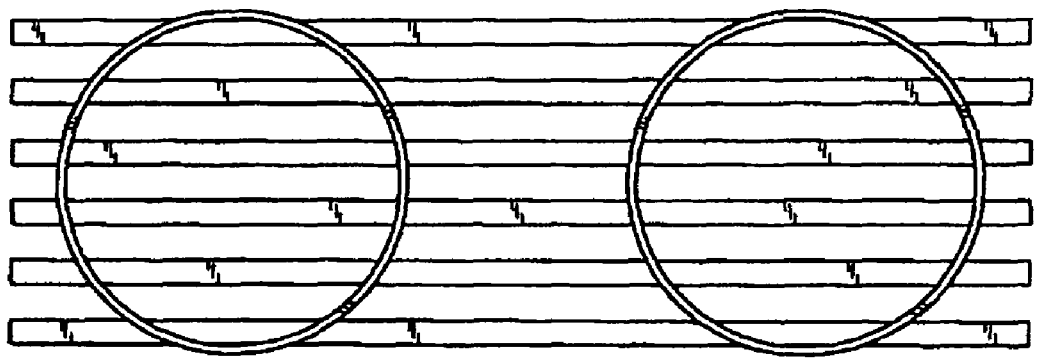
Figure 42:
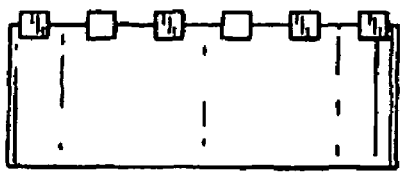
Figure 43:
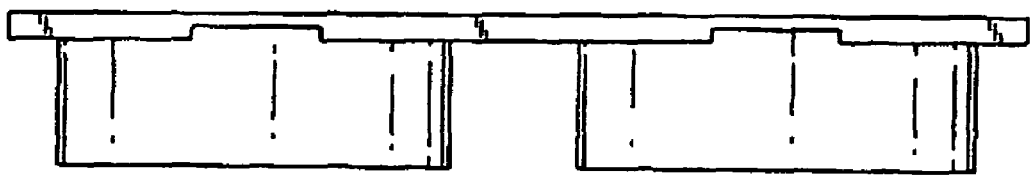

FIG. 5 shows an accessory 4 for fitting on top of a pedestal base 1 as shown in FIGS. 1-3 when there are support members which extend almost half way across the pedestal base, from one side only as shown for example in FIG. 8, or from both sides. The accessory comprises five parallel arms 41 which are joined together by a central rib 42. The arms 41 have a length such that they rest on top of the upper periphery 12 of the pedestal base 1 and a width such that they fit between the support members.

FIGS. 6 and 7 show cylindrical pedestal bases of the invention comprising a lower tubular member 5 and an upper tubular member 1 which is similar to the pedestal base shown in FIG. 1, except that it does not contain apertures. A tubular linking member 6 is placed between the tubular members 1 and 5, and permits them to be rotated relative to each other.

The linking member 6 includes a radial section 61 which extends between the tubular members 1 and 5. In FIG. 6, the remainder of the linking member lies within the tubular members 5 and 6. In FIG. 7, the remainder of the linking member lies outside the tubular members 5 and 6.

FIG. 8 shows a pedestal of the invention including two lower pedestal bases 1A and 1B, an upper "upside-down" pedestal base 1C, and six support members 2, which are slidably fitted into channels in, and extend a little less than half way across, the two lower pedestal bases 1A and 1B. The upper pedestal base 1C is placed on top of the support bars and can be slid from the position shown from one side of the pedestal to the other.

Figure 44:
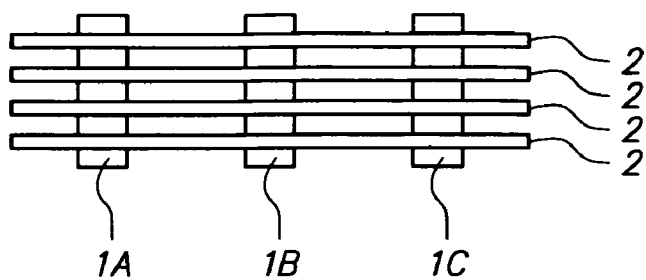
Figure 45:
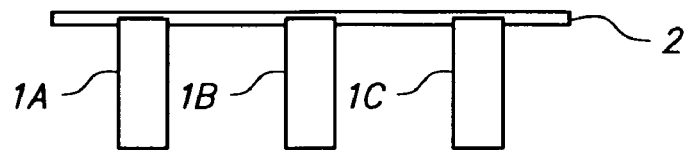
Figure 46:
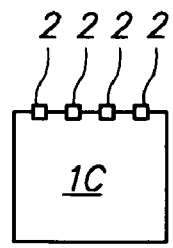

FIGS. 44-46 show a pedestal of the invention and comprising a pedestal base composed of three separate wall members 1A, 1B and 1C, each having four open channels and its upper surface. Four support members 2 are slidably fitted into the open channels.

Figure 47:
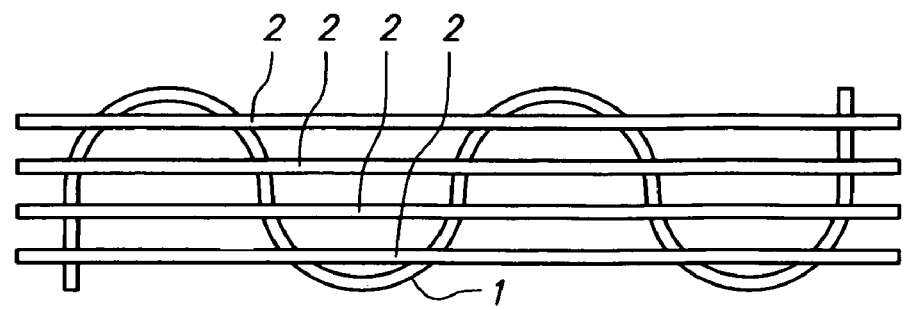

FIG. 47 shows a pedestal of the invention comprising a serpentine monolithic pedestal base 1 having 20 open channels in its upper surface. Four support members 2 are slidably fitted into the open channels. The end view of FIG. 47 is the same as FIG. 46.

Figure 48:
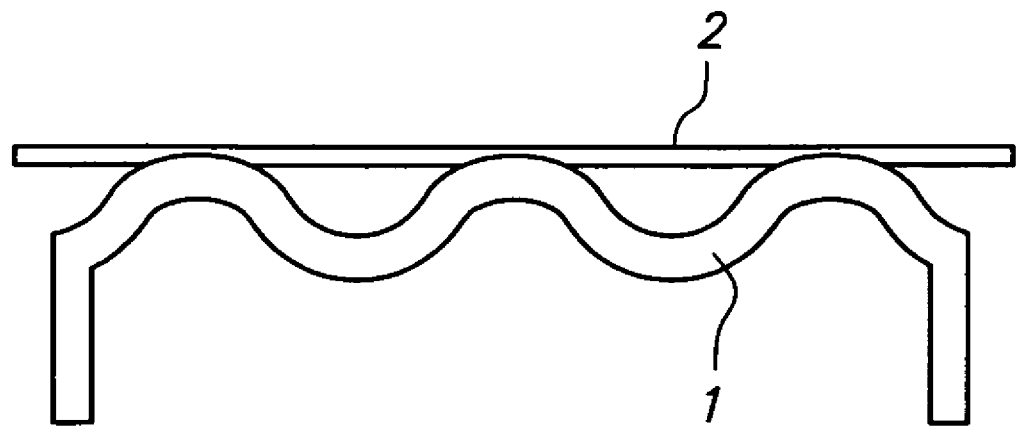
Figure 49:
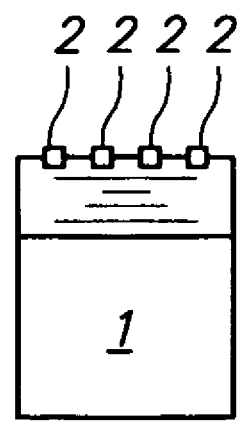
Figure 50:
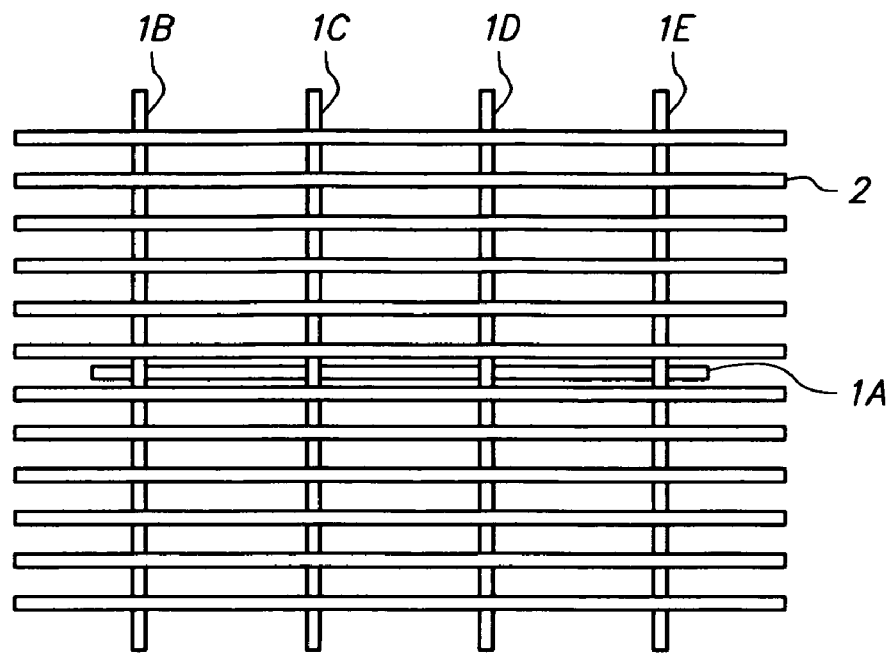
Figure 51:
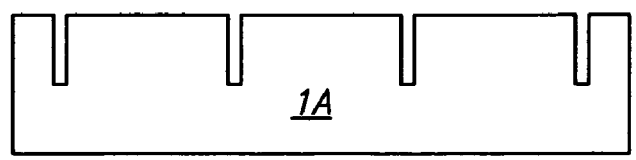
Figure 52:
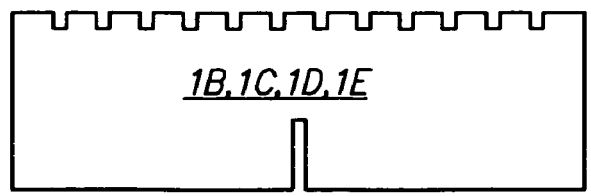

FIGS. 48-49 show a pedestal of the invention comprising a bridge-shaped pedestal base 1 having twelve open channels in its undulating upper surface. Four support members 2 are slidably fitted into the open channels.

Figure 53:
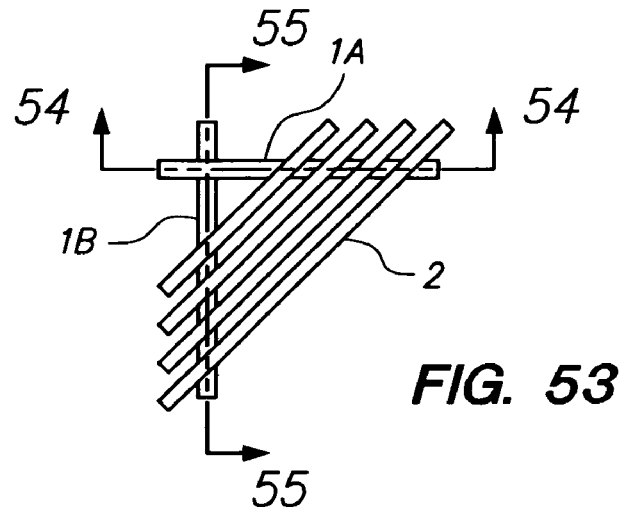
Figure 54:
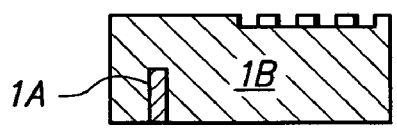
Figure 55:
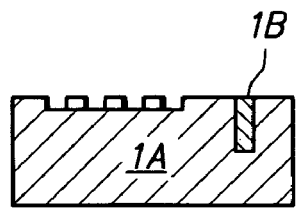

FIGS. 53-55 show a pedestal of the invention in which the pedestal base is a tube having an open cross-section formed by two interlocking wall members 1A and 1B.

Figure 56:
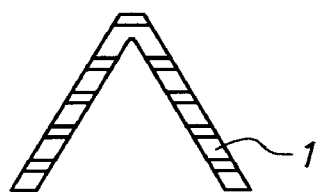
Figure 57:
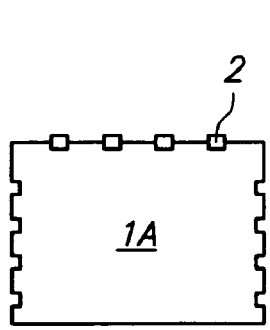
Figure 58:
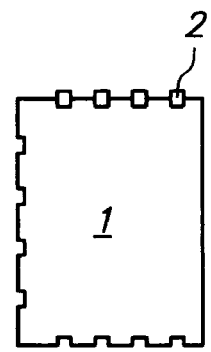

FIG. 56 shows a pedestal base of the invention which is a tube having an open cross-section and having open channels in the apex and in the upper and lower peripheries. Two or more such bases can be used with their axes horizontal so that the open channels in the apices of the bases can slidably receive support members in accordance with the invention, as shown in FIG. 57, or one or more such bases can be used with the axis vertical, so that the open channels in either or both of the upper and lower peripheries can slidably receive support members in accordance with the invention, as shown in FIG. 58.

Insofar as the Summary of Invention and Detailed Description above, and the accompanying drawings, disclose any additional invention which is not within the scope of the claims below, we do not dedicate such additional invention to the public and we reserve the right to file one or more continuing applications to claim such additional invention.

What is claimed is:

1. A pedestal which comprises
   (1) a pedestal base having an upper surface which defines at least two pairs of open channels, each pair of open channels being sized and spaced so that horizontal straight support member of constant cross section can be slidably filled into the pair of channels so that the position of each support member can be changed by sliding the support member horizontally within the channels, with a midsection of the support member lying between the open channels and having an open space underneath it, and the pairs of channels being placed on the upper surface so that, when a straight support member is fitted into each pair of channels, the support members are parallel to each other; and
   (2) at least two horizontal support members, each support member being slidably fitted into one of the pairs of channels in the upper surface of the pedestal base so that its position can be changed by sliding it horizontally within the channels with a midsection of the support member lying between the open channels and having an open space underneath it and with end sections of the support members extending beyond the channels and having an open space underneath each end section, and the support members having top surfaces which lie in a single horizontal plane which is higher than the upper surface of the pedestal base.

2. A pedestal according to claim 1 wherein the pedestal base comprises a hollow tube having an upper peripheral surface which defines the pairs of open channels and a lower peripheral surface.

3. A pedestal according to claim 2 wherein the hollow tube is cylindrical and the upper and lower peripheral surfaces lie in parallel planes.

4. A pedestal according to claim 3 wherein the pedestal base comprises two or more tubular members which can be rotated relative to each other about the axis of the pedestal base.

5. A pedestal according to claim 4 wherein the pedestal base comprises a lower tubular member, an upper tubular member, and a tubular linking member which
   (a) lies between the lower and upper tubular members,
   (b) comprises
      (i) a radial section which extends between the upper and lower members, and
      (ii) a tubular section having an upper portion which is adjacent to but spaced apart from the upper tubular member and a lower portion which is adjacent to but spaced apart from the lower tubular member.

6. A pedestal according to claim 2 wherein the hollow tube has an open cross-section throughout its height.

7. A pedestal according to claim 1 wherein the pedestal base comprises an undulating upper surface which includes the pairs of open channels.

8. A pedestal according to claim 7 wherein the upper surface is corrugated.

9. A pedestal according to claim 2 wherein the pedestal base comprises two or more separably interlocking wall members.

10. A pedestal according to claim 1 wherein the pedestal base comprises at least 4 pairs of channels, the number of the support members is equal to the number of pairs of channels; each of the support members is a straight support member slidably fitted into one of the pairs of channels; and the support members have the same cross section.

11. A pedestal according to claim 1 wherein the support members have a square cross-section 12. A pedestal according to claim 10 wherein the support members have a round cross-section.

13. A pedestal according to claim 1 which comprises
   (1) a first base pedestal which has the pairs of open channels in its upper surface,
   (2) a second base pedestal which has the pairs of open channels in its upper periphery and which is spaced apart from the first base pedestal, and
   (3) a plurality of straight support members each of which is slidably fitted into a pair of open channels in the first base pedestal and into a pair of open channels in the second base pedestal.

14. A pedestal according to claim 13 which comprises an upper member having a lower peripheral surface including at least two pairs of open channels which are sized and spaced so that the upper member is slidably fitted on top of the support members.

* * * * *